Sept. 30, 1969   C. G. MUNTERS ET AL   3,470,280
METHOD FOR THE PRODUCTION OF DIAGONALLY PLEATED PAPER MATERIAL
Filed Oct. 31, 1966   5 Sheets-Sheet 1
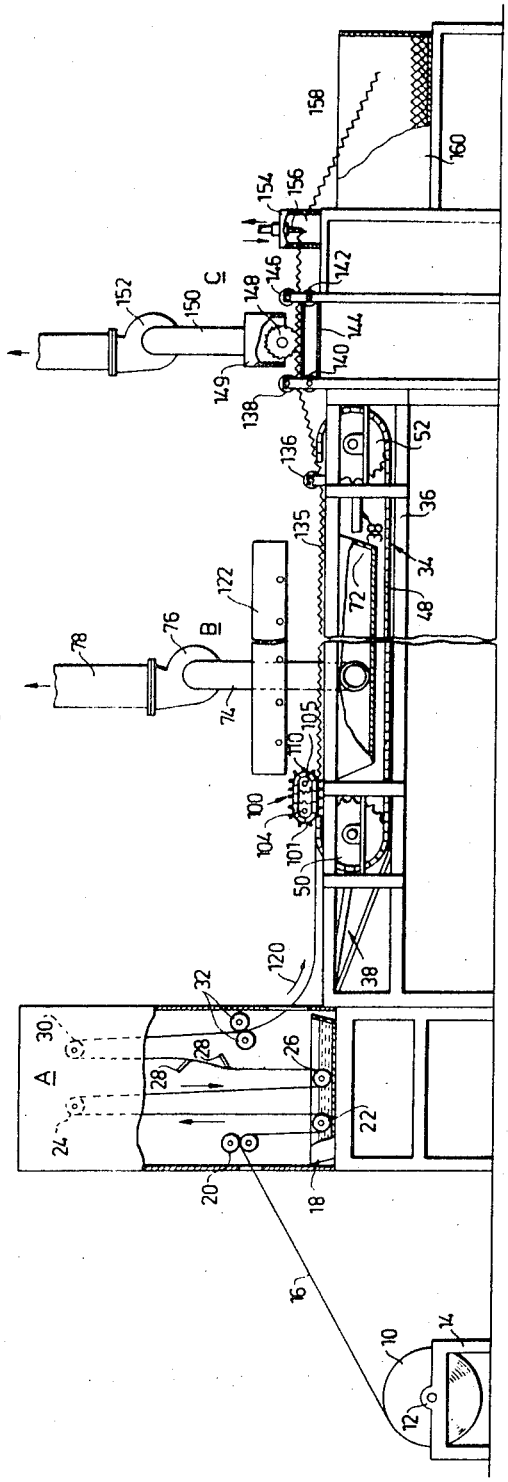
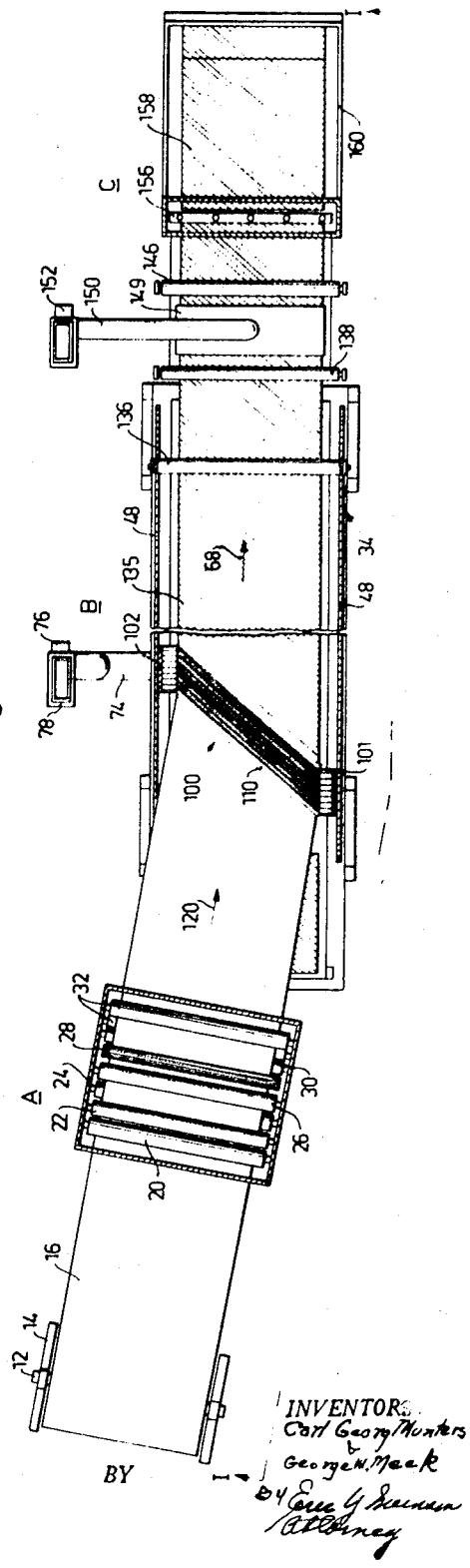
INVENTORS
Carl Georg Munters
George N. Meek
BY
Attorney Sept. 30, 1969    C. G. MUNTERS ET AL    3,470,280
METHOD FOR THE PRODUCTION OF DIAGONALLY PLEATED PAPER MATERIAL
Filed Oct. 31, 1966    5 Sheets-Sheet 3

Sept. 30, 1969   C. G. MUNTERS ET AL   3,470,280
METHOD FOR THE PRODUCTION OF DIAGONALLY PLEATED PAPER MATERIAL
Filed Oct. 31, 1966   5 Sheets-Sheet 4
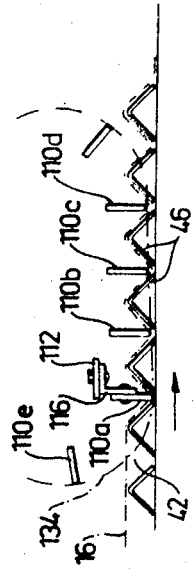
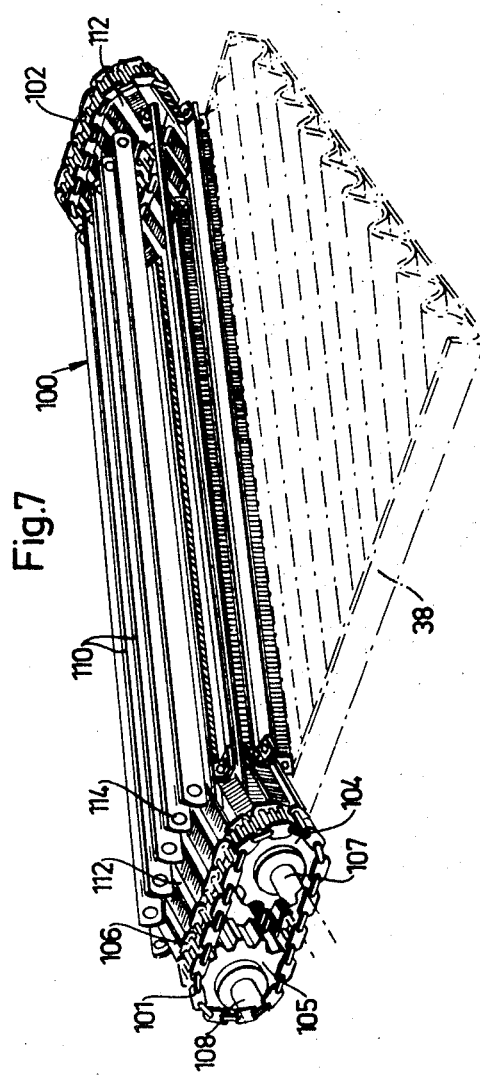
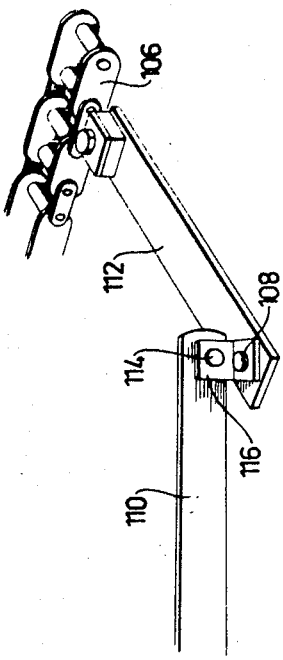
INVENTOR
Carl Georg Munters
George W Meek
BY
Eric G Meeseman
Attorney Sept. 30, 1969     C. G. MUNTERS ET AL     3,470,280
METHOD FOR THE PRODUCTION OF DIAGONALLY PLEATED PAPER MATERIAL
Filed Oct. 31, 1966     5 Sheets-Sheet 5
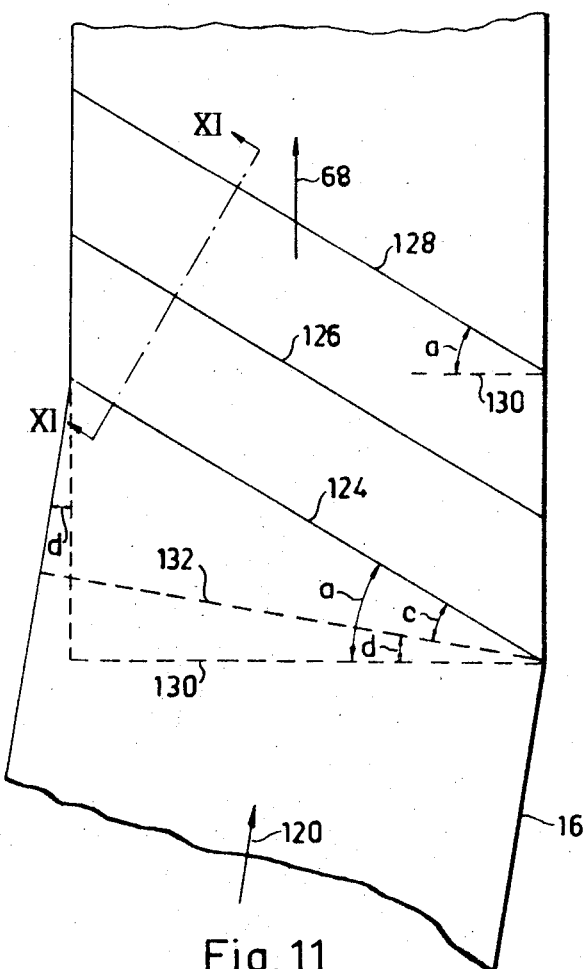
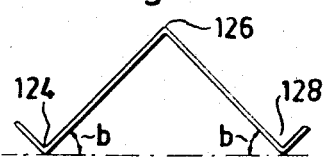

United States Patent Office 3,470,280
Patented Sept. 30, 1969

---

3,470,280
METHOD FOR THE PRODUCTION OF DIAGO-
NALLY PLEATED PAPER MATERIAL
Carl Georg Munters, 3 Danderydsvagen, Stocksund,
Sweden, and George W. Meek, P.O. Box 1909, Fort
Myers, Fla. 33902
Filed Oct. 31, 1966, Ser. No. 590,919
Claims priority, application Sweden, July 22, 1966,
10,065/66
Int. Cl. B31b 1/20; B31f 1/36, 1/20
U.S. Cl. 264—90                              5 Claims

ABSTRACT OF THE DISCLOSURE

Method for diagonally pleating a paper or like material in which a web of deformable material is delivered to a station where the web is impregnated with a liquid solution and is then fed into a perforated mold which moves in a closed path and which has grooves extending diagonally across it, the web being introduced angularly to the mold to compensate for the pull exerted thereon and being subjected to heat while being engaged in the mold grooves.

---

The present invention relates to a method for the production of diagonally pleated or corrugated paper material, the primary application for which is in contact or exchange bodies between two media, one of which may be a liquid, such as water, and the other a gas, such as air. As an example of the application of these contact bodies or packings are cooling towers, humidifiers and similar equipment used in air conditioning systems.

It should be understood that the diagonal or pleating corrugation within the scope of this invention means that the pleats or corrugations extend at an oblique angle to the side edges of the sheet material. It should furthermore be understood that the designation paper sheet material or paper web means a fibrous material such as asbestos or cellulosic fiber material.

Material of this kind possess in itself very slight stability and loses much of its durability or strength particularly when wet. It is known heretofore that the wet strength of the material can be increased by impregnating it with a substance which is insoluble in the liquid streaming through the contact body. As examples of such substances may be mentioned resinous or plastic material which may comprise or contain phenol or melamin. The substance is usually added to the material by wetting the paper with the impregnating substance or with the liquid containing the impregnating substance with a consequent considerable reduction in the durability or wet strength of the paper sheet material in this stage. Furthermore, the material of which the sheets are composed is characterized by its very slight surface extensibility and, therefore, cannot be stretched to any appreciable degree without risk of damage.

In the contact body all of the sheets may be corrugated in which case the diagonally extending corrugations cross one another in adjoining or contiguous sheets. For this reason the sheets must be produced in their corrugated shape as self-sustaining units which can be stacked together with the corrugations in adjoining sheets extending in cross-wise relationship, as shown for example in U.S. Patent 3,262,682 to Sven Henry Bredberg. Preferably the sheets may be bonded together at their points of contact by means of a suitable adhesive. These requirements create certain problems for an efficient and economic production of the corrugated sheets.

It is, therefore, among the objects of the invention to provide a method for the production of these sheets according to which a web of material is impregnated with the liquid substance, corrugated diagonally and dried or cured in a continuous sequence.

Another object is to provide a method for corrugating a continuous moving web of the material, such as a paper web, on the bias having regard to the oblique pull or displacement of the separate parts of the web which results from the bias corrugations.

Still another object is to described an apparatus comprising a molding form having a series of ribs and grooves which moves in a continuous path while supporting the paper web during the corrugating process and during the conversion of the impregnating substance into solid form.

These and other objects will become apparent from the following description taken with reference to the accompanying drawings, which disclose by way of example an embodiment of the invention.

FIG. 1 is a schematic side view taken along the line I—I of FIG. 2;

FIG. 2 is a top plan view partly in horizontal section without any heating equipment;

FIG. 7 is a perspective view of the forming head which is part of the corrugating combination;

FIG. 8 is a perspective view of a detail of the forming head shown in FIG. 7 drawn to an enlarged scale;

FIG. 9 is a schematic side view showing the operation of the forming head;

FIG. 10 is a broken-off portion of the paper web showing the directions of movement before and after the formation of the corrugations;

FIG. 11 is a section taken along the lines XI—XI of FIG. 10.

Figure 3:
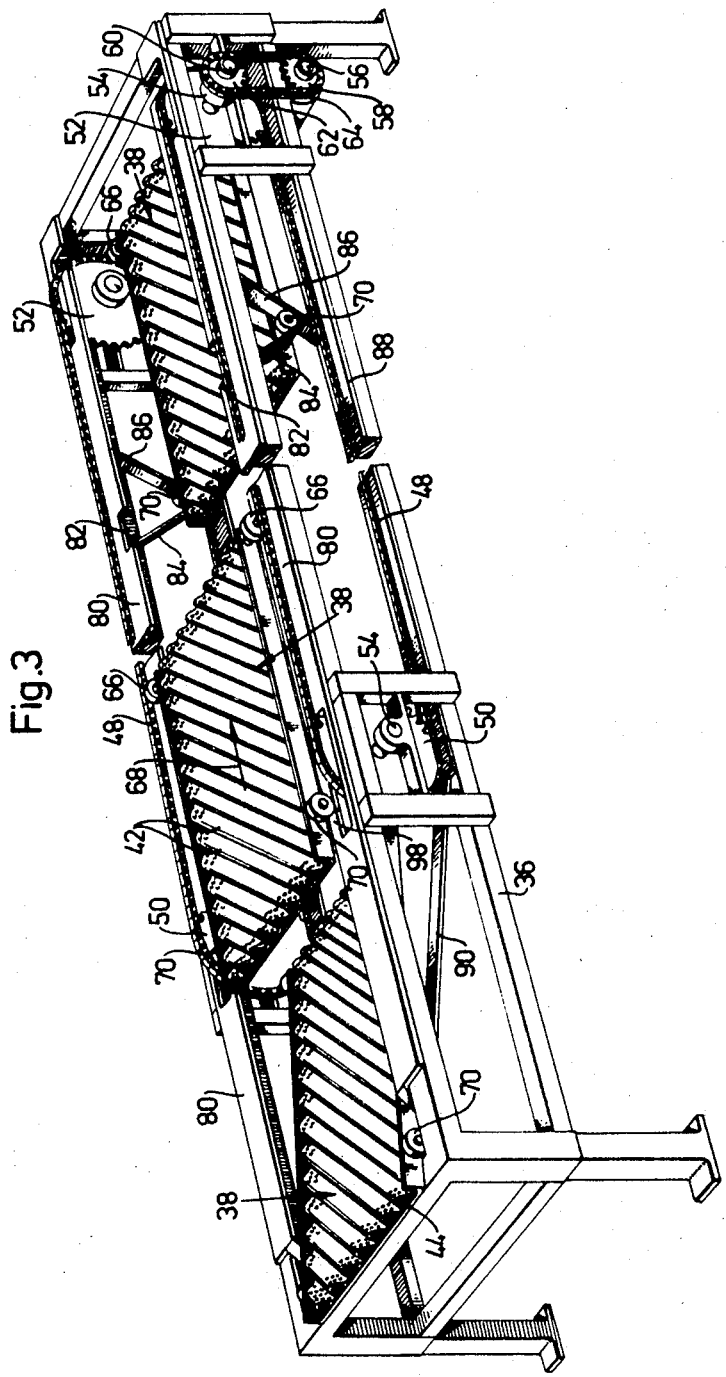
FIG. 3 is a perspective view partly in section drawn to an enlarged scale showing the molding form which is movable in a continuous path.

The apparatus according to the embodiment shown comprises the following principal parts: an impregnating section A, a corrugating and drying station B, and a station C for cutting up the finished paper web in pieces or sheets.

The web 16 is unwound from the roll of asbestos paper 10, which is supported by the axle 12 in the frame 14, and is then fed into the impregnating section A. The impregnating section has a trough 18, which contains a suitable impregnating liquid, which after heat treatment will impart to the asbestos material the required mechanical strength and durability in wet, as well as in dry, condition, and otherwise protect and reinforce the web against damage. This liquid may comprise a solvent having one or more impregnating substances dissolved therein. As examples may be mentioned an aqueous solution of melamin in which the liquid may contain a minor amount of alcohol and a catalyst in order to accelerate the conversion of melamin into solid, water-insoluble form.

The web 16 which might have a thickness of about one or some tenths of millimeter is pulled between the rollers 20 into the liquid bath around the pulley 22 and then upwardly over the pulley 24 and then downwardly again into the bath by the pulley 26. The length of this part of the web is measured so that the asbestos material will have sufficient time to be thoroughly impregnated with the melamin solution. Surplus of the impregnating solution is removed from the web during the upward movement thereof by means of scrapers 28 before it is pulled over the upper pulley 30 and then downwardly between the two rollers 32, which are spring-urged towards one another, and one of which has a polished steel surface while the other has a synthetic rubber surface. Further surplus of the impregnation solution is squeezed out between these two rollers to such an extent as to eliminate any tendency of the web sticking in the corrugating device. The thus removed surplus is returned to the trough 18.

The rollers and pulleys in the impregnating system are driven by a driving mechanism, not shown, the speed of which is synchronized with the speed of the corrugating system B, so that the paper web will be fed into the latter at a constant speed and direction.

Figure 4:
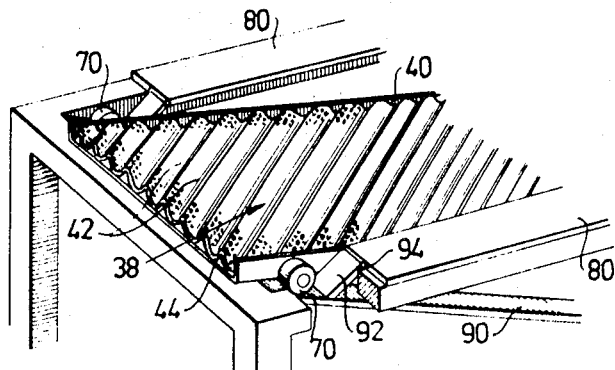
FIGS. 4 and 5 are partial perspective views of parts shown in FIG. 3, but drawn to a larger scale.
Figure 5:
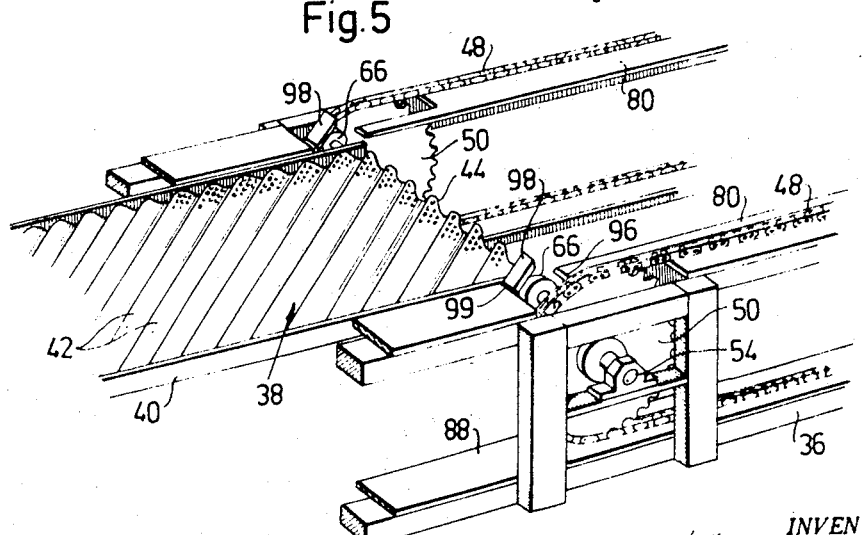

The station B adjoining the impregnating system A is provided with a bottom forming member which is movable in a continuous path and which is generally designated with the reference numeral 34 and is supported by the frame 36. This arrangement is shown in FIGS. 3–5 and is only partially disclosed in FIGS. 1 and 2. The corrugating forms comprise a series of plates 38 each of which comprise a frame 40 and an inner portion which has diagonally extending mutually parallel ribs and grooves 42. These grooves may be formed in a continuous plate 44 or by plate elements 46 which are bent at an angle and slightly separated from one another as shown in FIG. 9. In the latter modification these angularly bent sections may be individually fixed at their ends to their side members of the frame 40. The plates should be thin so as to give it as little heat capacity as possible. Furthermore, the plate is perforated over its entire surface so that the vapors, which boil off during the drying process of the paper web, can easily escape also downwardly through the plate. The aggregate perforated area may exceed 50% of the total plate area. This is important because by reason thereof the boiling off speed can be maintained high so that the heating time can be kept short, but, also, the escape downwardly of the vapors will prevent them from blowing the web from the corrugating plates.

The plates 38 are driven in a continuous path by two chains 48 meshing with their respective sprockets 50 and 52. These wheels are journaled in the bearing 54 in the frame 36 and are driven by a motor (not shown) through a common shaft 56 (FIG. 3). For the sake of clearness only a limited number of plates 38 have been shown in FIG. 3. The shaft 56 carries a pinion sprocket 58 and the shaft 60 of one of the sprocket wheels 52 carries another pinion sprocket 62, which pinions mesh with the drive chain 64. The shaft 56 extends beneath the drive chains 48 transversely across the frame and drives the sprocket wheel 52 by means of a similar driving mechanism comprising pinions 58 and 62 and a drive chain 64. In this manner cross-wise extending shafts between the two pairs of sprocket wheels 52 and 50 will be avoided and which will permit the plates to be moved vertically. The rectangular plates or corrugating units 38 are supported at their ends by the rollers 66, the hubs 67 of which (FIG. 6) are connected with the chains 48 and which roll in a guideway as will appear from the following. The rollers 66 may be arranged in that end of the corrugating plates 38 which in the upper parts of the corrugating mechanism or corrugating belt 34 forms the front end seen in the direction of movement 68 according to FIGS. 2 and 3. The rear end of the plates are also supported by rollers 70 which, however, are free of the chains 48 so that they engage only the aforementioned guideway.

Beneath the endless corrugating belt 34 is a hood 72 which is closed at the bottom and at the sides but open at the top and which by means of duct 74 is connected with an exhaust fan 76 which in turn is connected with a funnel 78 on the exhaust side. By means of this fan a partial vacuum on the order of 25–75 mm. water gauge is maintained in the hood or chamber 72.

Above the vacuum chamber 72 the corrugating plates 38 are brought together so that their ribs and grooves extend in a continuous length without any spacing therebetween. The rollers 66 and 70 then engage an upper straight portion 80 of the guideway on each side of the plate 38, the respective front and rear edges of which abut one another. After one plate 38 has passed the vacuum chamber 72 the rear rollers 70 descend through the openings 82 (FIG. 3) in the guideway and are guided by the portions 84, and 86, which incline against one another and which are spaced from one another at their lower ends a distance sufficient to permit the rollers 70 to pass between the same. At the same time the forward rollers 66, governed by the chains 48, have been forced downward about the sprocket wheels 52. The angle of inclination between the portions 84 and 86 may be calculated so that the ends of the plate 38 descend in a parallel direction. The rollers 66 and 70 will then engage the lower planar portion 88 of the guideway while the plate is returned by the chains 48 to its starting position. The horizontal portion 88 of the guideway transcends into an upwardly inclined portion 90 which during the continued return movement engages the rollers 70 so that the rear end of the plate, after having passed beneath the vacuum chamber 72, is raised to the upper plane guideway portion 80.

Figure 6:
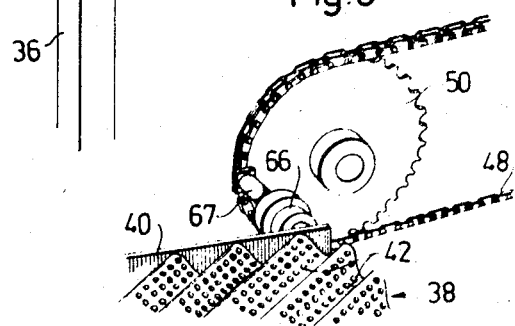
FIG. 6 is a perspective view of a detail shown in FIG. 5.

FIGS. 4 and 6 show the left-hand end position of a plate 38 during a cycle of the endless belt. The rollers 70 have reached the upper end of the portion 90 of the guideway after having passed beneath the flap 92 which is pushed upward about its pivot 94 and then again drops down. The other end of the plate 38 is simultaneously conveyed upwardly about the sprocket wheels 50 by the chains 48. The position according to FIG. 4 of the rollers 70 corresponds to the extreme left-hand position of the hubs 67 of the rollers 66, according to FIG. 6, during the upward movement of the latter about the periphery of the sprocket wheels 50. During continued movement of the drive chains 48 the rollers 70 roll up on top of the flap 92 until they engage the upper plane portion of the guideway 80. Simultaneously the rollers 66 ascend through an opening 96 in the respective guideway portions 80 and which opening is normally closed by a flap 98 pivoted about shaft 99 so that it can be pushed up and permit passage of the roller 66. After the flap 98 has returned to its horizontal position, the rear roller 70 can pass over the flap without changing its level (see FIG. 3). The movement of a row of plates 38 is such that the rear end of the forward plate and the forward edge of the rear plate abut or are closely adjoining when the two plates after the turn rest with their rollers on the straight portion 80 of the guideway. In this manner there will always be a forming belt over the vacuum chamber 72 which is composed of a plurality of abutting corrugating plates 38 forming a continuous length of a series of ribs and grooves 42.

The herein described forming or molding mechanism 34 cooperates with an upper forming head 100, which, in the embodiment shown, comprises two conveyor mechanisms 101 and 102 each of which comprises two sprocket wheels 104, 105 meshing with a drive chain 106. Shafts 107, 108 on which these sprocket wheels 104, 105 are mounted are mutually parallel and extend perpendicularly to the direction of movement 68 of the lower forming belt. The conveyor mechanisms 101, 102, on the other hand, are offset from one another a distance corresponding to the angle of the grooves 42 to the direction of movement 68. A plurality of battens or strips 110 extend between the two conveyor mechanisms and which at their ends are connected to the brackets 112 fixed to the chains 106. Each of the battens or strips 110 by means of pivot pins 114 are journaled in angle brackets 116 which in turn by means of pivots 118 are pivoted to the brackets 112. The pivot pins 114 and 118 extend perpendicularly towards one another. The mecahnism is thus so constructed that the battens 110 can be moved in a continuous path between the two offset conveyor mechanisms 101, 102 and simultaneously can be turned about the pivot pins 114, 118 so that during the lower portion of the path they are positioned vertically and parallel with the grooves 42 in the plates 38.

The shafts 107, 108 in the two conveyor mechanisms 101, 102 are driven synchronously by means of a drive mechanism (not shown). The movement is furthermore so synchronized relative to the speed of the lower forming belt that the battens 110 and the grooves 42 move with the same speed and thus cooperate with one another when corrugating the paper web. The forming head 100 is mounted above the vacuum chamber 72 at the feed-in end of the asbestos web 16 in the direction shown by the arrow 120. A heater 122 overlies the forming belt and extends substantially over the entire length of the vacuum chamber 72. The heater is preferably of the radiation type and may comprise electric or gas heated elements which produce a higher temperature, for instance on the order of 1000° C. or higher, so that the paper web is subjected to an intense heat radiation while it passes beneath the heater. In this manner, an amount of heat may be conveyed to the wet paper web per unit of time and surface which is many times greater than that produced principally by convection. The length of the web in the drying section can thereby be reduced to a fraction of the length which would otherwise be necessary.

The angle $a$ (FIG. 10) of the diagonal grooves 42 is determined by the factors which for example prevail in a cooling tower packing with air and liquid flowing through the same. The angle may be either larger or smaller than 45°. A diagonal angle of about 20°–40° and preferably about 30° is specially suitable for cooling tower fill. Corrugation on the bias produces an angular pull on the paper web and a reduction of its width considered in the direction perpendicular to its longitudinal plane before and after the corrugation. Therefore, if the paper web, as in the example shown, is introduced between the forming members 38, 100 in the same plane in which it proceeds between these forming members and, if the direction besides has to conform with the intended direction after the corrugation, the paper web would be pulled sideways and would rupture. For this reason it is important that the material web, such as a paper web, is introduced at such an angle to the direction of movement of the forming members 38, 100 that it provides compensation for the sidewise displacement of the paper material. This angle will be apparent from FIGS. 2 and 10 which show the directions of movement 68 and 120. The transversal lines of the paper web 16 from the supply roll 10 to the corrugating member 100 has a constant direction and form the same angle to the transversal lines of the corrugated web as the line of movement 120 forms to the line of movement 68 of the forming members. There are also other possibilities for providing the necessary compensation, as will be understood from the following in FIGS. 10 and 11 are shown the different angles involved in the directional changes of the web 16 during the corrugation process, it being understood that the corrugations for the sake of simplicity are shown as symmetrically formed and with sharply defined pleats. The material web moves along the arrow 120 before the first pleat is formed along the line 124. The line 126 designates the apex of this corrugation and the line 128 indicates the formation of the next pleat. The reference $a$ designates the angle between the transversal line 130 of the pleated web and the direction of the diagonal pleats along the lines 124, 126, 128. The reference $b$ designates the angle of the pleats seen in the section XI–XI. The angle between the diagonal corrugating lines and the transversal line 132 of the incoming plain paper web is designated $c$ and the angle between the two transversal lines 130 and 132 is designated $d$. The last-mentioned angle determines the degree of deviation between the lines of movement of 120 and 68. The following equations apply:

$$\tan c = \tan a \cdot \cos b$$
$$a = c + d$$

and therefore $$d = a - c$$

The angulation between the two lines of movement 120, 68 is consequently determined by the angle $d$ as the incoming plain web 16 and the corrugated web are in the same horizontal plane. However, compensation for sideways pull may also be produced by feeding the plain portion of the web 16 obliquely to the pleating line 124 and thus forming an oblique angle with this line and with the horizontal line. If this angle of deviation is equal to the angle $b$, the angle $d$ seen from above will be 0. However, irrespective of the angle, which the web 16 may form with the plane of the pleated web the angle between the diagonal line 24 and the transversal line 132 should have the value $c$. Minor deviations from the above may arise when the pleats are formed somewhat unsymmetrically or when the fold lines are rounded off.

The impregnated wet web 16 is introduced between the forming members 38 and 100 for corrugation and subsequent drying. The pleats are formed by the battens 110 descending into the grooves 42, one after the other, and while their longitudinal movement is synchronized with that of the grooves. Thus, each batten together with its longitudinally moving component moves successively downward into the bottom of its respective groove forcing down the paper web and forms a pleat. In FIG. 9 one batten or strip 110a has just reached the bottom of the groove while pressing down thereinto the web 134 designated by the broken line. In order to make sure that the earlier formed pleat remains in its groove, it is important that it in some manner is retained therein with sufficient force while the incoming plain portion of the paper web is continuously pulled through the forming mechanism. For this purpose the batten 110b having formed the previous pleat may be retained in or in the proximity of the bottom of the groove. The same applies to battens 110c and 110d, if such are used. These are shown in FIG. 1 as gradually rising out of the grooves before they finally clear them. The retention of the corrugated portion of the asbestos web may also be accomplished or augmented by suction from beneath or by other mechanical means, such as shown in copending application Ser. No. 420,353, filed Dec. 22, 1964, in the name of George W. Meek.

It is also of considerable importance that one pleat or corrugation at the time is formed in the paper web 16. Thus each pleat should be completed or substantially completed before the batten again presses down the web into the groove for the next pleat. In this manner the relatively frail wet paper web momentarily glides over only one ridge between two grooves. When two or more pleats are formed at the same time by their respective batten 110, the paper web must then glide over two or several such ridges and under one or several battens which creates too great friction with consequent risk of rupture of the paper web. As will be seen from FIG. 9, the batten 110a has reached its bottom position in the groove before the next batten 110e engages the web 16 shown in broken lines.

Even after the corrugation, the paper web has no appreciable stability. It is, therefore, retained in the forming plates 38 while the web proceeds over the vacuum chamber and beneath the radiating heater 122. During this process the liquid in the impregnating solution is boiled away rapidly and the vapors, in this case steam, are exhausted by means of a fan 76. In order to remove the upwardly evaporated vapors from the paper web, a special fan system may be provided or the corrugated paper web may be somewhat narrower than the perforated plates 38 so that free areas are formed along the edges through which the vapors can be sucked into the vacuum chamber 72. The drying process is carried out until the impregnating substance entirely or partially is converted into solid form, thus rendering the paper web stiff. On the other hand, if the impregnating substance is curable as is the case with melamin, it is not necessary to completely cure it in Station B.

After having passed the vacuum chamber 72 the corrugated paper web 135 is conveyed by means of the roller 136 and the pair of rollers 138, 140, preferably at an upward angle, thus lifting it from the last forming plate 38 which then descends to the bottom portion of the forming section. A conveyor belt 144 may be provided about the rollers 140 and 142 for conveying the paper web further. A counter roller 146 is mounted above the roller 142. In this part of the machine, which is part of station C, the edges of the web are cut, and if desired, the web is severed into narrower widths by means of one or several saws 148. The resultant waste material from the saws is exhausted through hood 149, conduit 150, and fan 152. The corrugated web 135 is thereafter introduced to the cutting device 154 having a cutting knife or the like 156, which cuts up the web transversely into sheet units 158. These fall down in the bin 160 and are then taken to an oven for final curing of the impregnating substance.

It should be understood that the invention is not limited to the shown embodiment, but may find a variety of expressions within the scope of the appended claims. Thus, the impregnation and drying, i.e., the removal of the solvent liquid, may be done beforehand, in which case the impregnating section A may be eliminated. This is specially the case if the impregnating substance is phenol for instance, which makes it possible to keep the impregnated web in the form of a roll for a relatively long period of time before final curing of the phenol. The impregnating substance, furthermore, should be of such type that it will become tacky or plastic by heating so that a permanent deformation can be carried out in the forming section. Thus, the station A can be reconstructed for the purpose of heating the dry preimpregnated paper web. After the actual pleating operation, the web may be subjected to a cooling process instead of a heating process. This holds true even if the impregnating substance should be thermoplastic.

In certain aspects the invention, particularly the feature providing compensation for bias pull during diagonal pleating, is applicable to other material than paper. The transversal direction of the material web 16 when unwound from the feed roll 10 or in the alternative in the station A may coincide with the transversal direction of the pleated portion of the material web. It is only necessary that that portion of the material web which is just about to be introduced between the forming members 34 and 100 has the oblique angle c according to the above. In such alternative instance, the web may be folded before the angularly mounted entrance portions in front of the forming head 100 so that its direction of movement can be changed.

The forming head 100 may be provided with battens 110 which are supported by the conveyors which impart a circular movement to their end portions. In this case, the rotation axles of the conveyors may be parallel with the diagonal pleats. The battens 110 will thus perform a certain gliding motion relative to the paper web in longitudinal direction of the grooves, which movement, however, can be reduced or eliminated by having the battens swingably journaled in this longitudinal direction simultaneously with the rotary movement.

What is claimed is:
1. The method of continuously forming a corrugated, substantially stabilized sheet from a web of deformable material which comprises first impregnating the web with a liquid solution of an impregnating substance and feeding the impregnated web from the impregnating station into one end of a perforated mold which moves longitudinally in a closed path and which comprses a series of grooves extending across the mold diagonally to the line of movement thereof, while engaging the web in the grooves, angularly introducing the web to compensate for the pull exerted thereon, moving the web together with the mold to thereby form a continuous series of successive corrugations extending across the web diagonally to the sides thereof, the impregnation of the web occurring away from and separate of the corrugating area, applying heat over a substantial area of the upper surface of the corrugated web while such web is engaged in the mold grooves.

2. Method according to claim 1 in which the web is retained in the grooves by difference in pressure exerted on the top and bottom of the mold.

3. Method according to claim 1 in which the web is retained in the grooves by applying suction to the bottom side of the mold.

4. Method according to claim 1 in which the suction also removes the vapors evaporated from the impregnating solution.

5. Method according to claim 1 in which the web is maintained in a position where the transversal lines extend in a horizontal plane before as well as after the corrugating process and the uncorrugated portion of the web forms an angle to the line of movement of the corrugated portion of the web seen from above.

References Cited
UNITED STATES PATENTS

| | | | |
|---|---|---|---|
| 2,193,052 | 3/1940 | Atwater | 154—30 |
| 2,350,996 | 6/1944 | Atkinson | 18—56 |
| 2,618,816 | 11/1952 | Joa | 19—144.5 |
| 2,808,098 | 10/1957 | Chavanes | 154—29 |

FOREIGN PATENTS 1,008,833  2/1964  Great Britain.

ROBERT F. WHITE, Primary Examiner

R. R. KUCIA, Assistant Examiner

U.S. Cl. X.R.

264—137, 286